US012571397B2

(12) United States Patent
Hu et al.

(10) Patent No.: US 12,571,397 B2
(45) Date of Patent: Mar. 10, 2026

(54) PUMP DEVICE

(71) Applicant: ZHEJIANG SANHUA AUTOMOTIVE COMPONENTS CO., LTD., Hangzhou (CN)

(72) Inventors: Jundi Hu, Hangzhou (CN); Yurong Zhu, Hangzhou (CN); Xiaoqiang Jia, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 132 days.

(21) Appl. No.: 18/038,499

(22) PCT Filed: Nov. 23, 2021

(86) PCT No.: PCT/CN2021/132223
§ 371 (c)(1),
(2) Date: May 24, 2023

(87) PCT Pub. No.: WO2022/111426
PCT Pub. Date: Jun. 2, 2022

(65) Prior Publication Data

US 2024/0102477 A1 Mar. 28, 2024

(30) Foreign Application Priority Data

Nov. 27, 2020 (CN) ......................... 202011353439.4

(51) Int. Cl.
*F04D 13/06* (2006.01)
*F04D 29/08* (2006.01)
*F04D 29/42* (2006.01)

(52) U.S. Cl.
CPC ....... *F04D 13/0626* (2013.01); *F04D 29/086* (2013.01); *F04D 29/426* (2013.01); *F05D 2230/232* (2013.01)

(58) Field of Classification Search
CPC ............. F04D 13/0613; F04D 13/0606; F04D 13/0626; F04D 29/007; F04D 29/026;
(Continued)

(56) References Cited

U.S. PATENT DOCUMENTS

2008/0031748 A1* 2/2008 Ihle ....................... F04D 29/426 29/888.024
2016/0177962 A1* 6/2016 Laing .................... F04D 29/061 417/423.13

(Continued)

FOREIGN PATENT DOCUMENTS

CN 105656229 A 6/2016
CN 205509792 U 8/2016

(Continued)

OTHER PUBLICATIONS

International Search Report for PCT/CN2021/132223 mailed Feb. 23, 2022, ISA/CN.

(Continued)

*Primary Examiner* — Essama Omgba
*Assistant Examiner* — Chirag Jariwala
(74) *Attorney, Agent, or Firm* — Yue (Robert) Xu; Apex Attorneys at Law, LLP

(57) ABSTRACT

Disclosed is a pump device, comprising a rotor assembly, a stator assembly and a spacer. The pump device has a first inner cavity and a second inner cavity; the pump device has a first housing and a second housing, the first housing partially covers the rotor assembly, the second housing at least partially covers surrounds an outer periphery of the stator assembly; the first housing and the spacer are fixedly connected by means of welding, and the connection position between the first housing and the spacer is sealed; the second housing and the spacer are fixedly connected by means of welding, and the connection position between the second
(Continued)

housing and the spacer is sealed; the spacer comprises a first flange portion and a cylinder portion.

20 Claims, 16 Drawing Sheets

(58) Field of Classification Search
CPC ...... F04D 29/086; F04D 29/40; F04D 29/406; F04D 29/42; F04D 29/426; F04D 29/4266; F04D 13/06; F04D 29/60; F04D 29/605; F04D 29/62; F04D 29/628; F04D 29/08; F05D 2230/232
USPC ........... 417/420, 423.1, 423.7, 423.8, 423.14
See application file for complete search history.

(56) References Cited

U.S. PATENT DOCUMENTS

2017/0089354 A1 3/2017 Shi et al.
2017/0302133 A1* 10/2017 Ehrsam et al. ........ H02K 1/185
2017/0343006 A1* 11/2017 Ehrsam .................. H02K 5/128
2020/0355187 A1* 11/2020 Bao et al. ........... F04D 29/5813
2022/0025896 A1* 1/2022 Ghelli ................. A61M 60/806
2022/0205455 A1* 6/2022 Qin ......................... F04D 13/06

FOREIGN PATENT DOCUMENTS

CN 106555765 A 4/2017
CN 110529226 A 12/2019
CN 211116646 U 7/2020
CN 211549999 U * 9/2020 ............. F04D 13/06
CN 214998252 U 12/2021
JP 2018035719 A 3/2018

OTHER PUBLICATIONS

European Search Report issued on Oct. 2, 2024 for the European counterpart application No. 21896927.7.

* cited by examiner

PUMP DEVICE

This disclosure is a national phase application of PCT international patent application PCT/CN2021/132223, filed on Nov. 23, 2021 which claims the benefit of the priority to Chinese Patent Application No. 202011353439.4, titled "PUMP DEVICE", filed with the China National Intellectual Property Administration on Nov. 27, 2020, which are incorporated herein by reference in its entirety.

FIELD

The present disclosure relates to the technical field of fluid control, and in particular to a pump device.

BACKGROUND

A pump device includes a rotor assembly, a stator assembly and a separating member, the pump device has a first inner cavity and a second inner cavity, the first inner cavity is located on one side of the separating member, the second inner cavity is located on another side of the separating member, the rotor assembly is located in the first inner cavity, and the stator assembly is located in the second inner cavity. During the manufacturing of the pump device, it may be required to detect the sealing performance of the first inner cavity and the sealing of the second inner cavity. Therefore, how to improve the accuracy of detecting the sealing of the first inner cavity and the second inner cavity is a technical problem to be considered.

SUMMARY

An object according to the present disclosure is to provide a pump device, which is beneficial to improving the accuracy of detecting the sealing of a first inner cavity and the sealing of a second inner cavity.

In order to achieve the above object, the following technical solution is provided according to an embodiment of the present disclosure:

- a pump device includes a rotor assembly, a stator assembly and a separating member, the pump device has a first inner cavity and a second inner cavity, the first inner cavity is located on one side of the separating member, the second inner cavity is located on the other side of the separating member, the rotor assembly is located in the first inner cavity, the stator assembly is located in the second inner cavity; the pump device further includes a first housing and a second housing, the first housing partially covers the rotor assembly, at least part of the second housing surrounds an outer circumference of the stator assembly; the separating member is partially arranged in the second housing; the first housing is arranged in contact with the second housing; or, a set distance is provided between the first housing and the second housing along an axial direction of the pump device; the first housing and the separating member are fixedly connected, and the first housing is sealed to the separating member; the second housing and the separating member are fixedly connected, and the second housing is sealed to the separating member; the separating member includes a first flange portion and a cylinder portion, the cylinder portion is connected to the first flange portion, the rotor assembly is partially located in a cavity of the cylinder portion, and the first flange portion extends in a direction away from the cylinder portion along a radial direction of the separating member; a portion for sealing in the first housing is located above the first flange portion, and a portion for sealing in the second housing is located below the first flange portion.

Through the above method, a detection medium in the first inner cavity can be leaked to an outer side of the pump device through the connection between the first housing and the separating member if the sealing of the first inner cavity and the sealing of the second inner cavity do not meet the requirements, so that the sealing of the first inner cavity can be detected, which is beneficial to improving the accuracy of detecting the sealing of the first inner cavity; a detection medium in the second inner cavity may be leaked to the outer side of the pump device through the connection between the second housing and the separating member if the sealing of the second inner cavity does not meet the requirements, so that the sealing of the second inner cavity can be detected, which is beneficial to improving the accuracy of detecting the sealing of the second inner cavity.

DETAILED DESCRIPTION OF THE EMBODIMENTS

The present disclosure is further illustrated hereinafter in conjunction with drawings and specific embodiments.

A pump device in the following embodiments can provide flow power for a working medium in a vehicle thermal management system, and the working medium may be water or an aqueous solution including 50% ethylene glycol. Certainly, the working medium may be other components. The pump device according to the present disclosure is described in detail below; it should be noted that, for the convenience of description, the following positional terms such as "up", "down", "high", "low", "top" and "bottom" are based on the state of each component in the pump device that has not been sectioned according to the placement position shown in FIG. 1.

Figure 1:
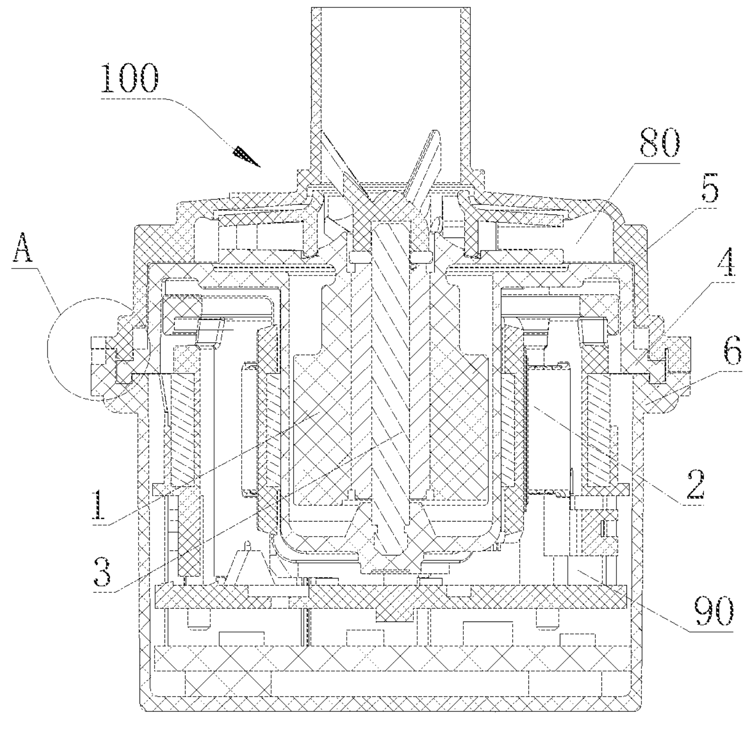
FIG. 1 is a schematic cross-sectional view of a first embodiment of a pump device provided according to the present disclosure.

Referring to FIG. 1, a pump device 100 includes a rotor assembly 1, a stator assembly 2, a pump shaft 3 and a separating member 4, the rotor assembly is sleeved on an outer circumference of the pump shaft 3; the pump device 100 includes a first inner cavity 80 and a second inner cavity 90. When the pump device 100 is in operation, a working medium can flow through the first inner cavity 80, and the second inner cavity 90 is not in direct contact with the working medium; the rotor assembly 1 is located in the first inner cavity 80, the stator assembly 2 is located in the second inner cavity 90, the first inner cavity 80 is located on one side of the separating member 4, and the second inner cavity 90 is located on another side of the separating member 4. Referring to FIG. 1, when the pump device 100 is in operation, an exciting magnetic field generated by the stator assembly 2 is controlled by controlling a current passing through a winding of the stator assembly 2, and the rotor assembly 1 rotates around the pump shaft 3 or drives the pump shaft 3 to rotate together under the action of the exciting magnetic field.

Figure 2A:
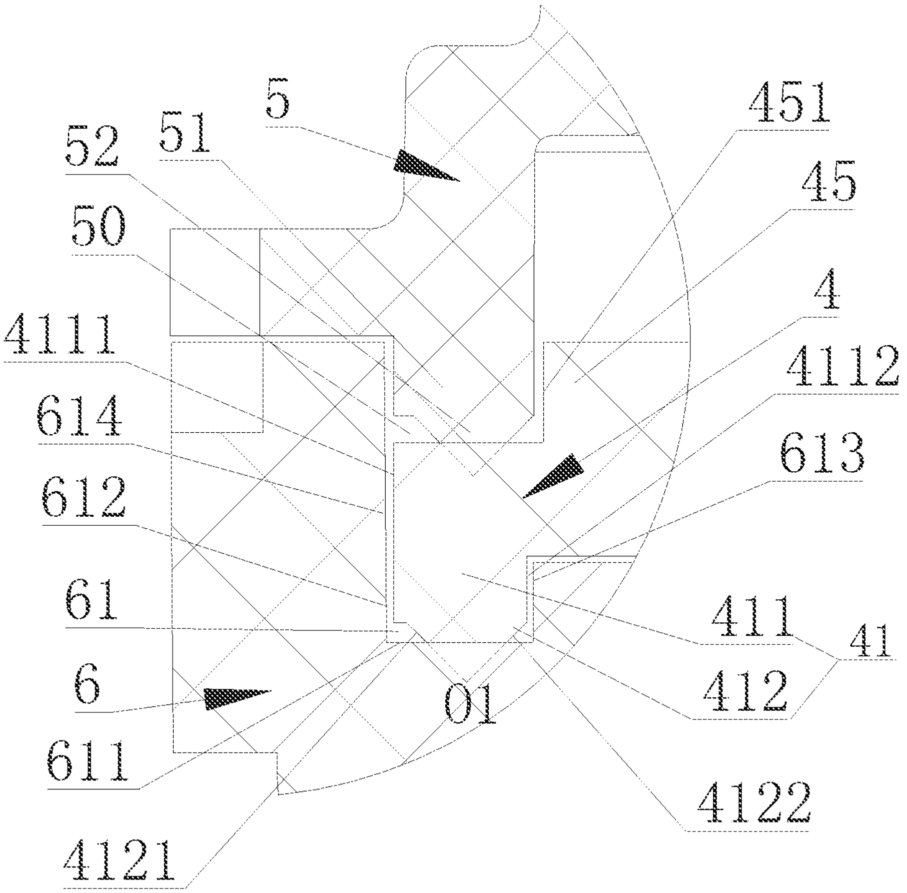
FIG. 2*a* is a schematic enlarged view of a first embodiment of portion A in FIG. 1 in an un-welded state.
Figure 2B:
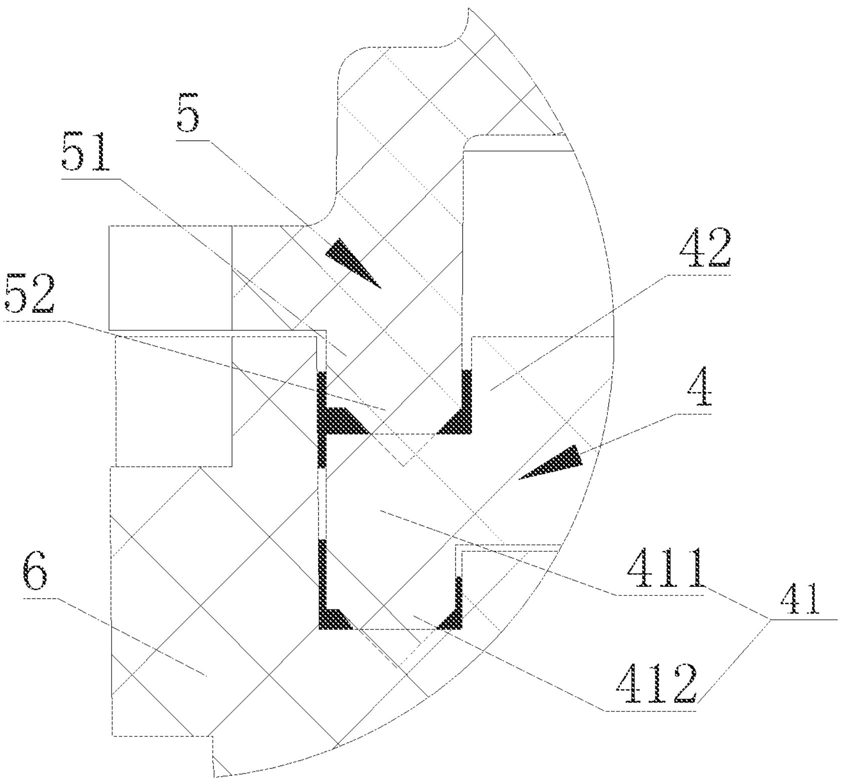
FIG. 2*b* is schematic enlarged view of a first embodiment of portion A in FIG. 1 in a welded state.

Referring to FIG. 1, the pump device 100 includes a first housing 5 and a second housing 6. In this embodiment, the first housing 5 partially covers the rotor assembly 1, an inlet (not indicated) and an outlet (not indicated) of the pump device 100 are formed in the first housing 5, the second housing 6 partially surrounds an outer circumference of the stator assembly 2, that is, the stator assembly 2 is accommodated in an accommodating cavity of the second housing 6. Referring to FIG. 1 to FIG. 2*b*, the separating member 4 is partially arranged in the second housing 6; in this embodiment, a set distance is provided between the first housing 5 and the second housing 6 along an axial direction of the pump device 100, the "set distance" here may be a set gap or other distance; certainly, the first housing 5 may be arranged in contact with the second housing 6. Referring to FIG. 1 to FIG. 2*b*, the first housing 5 and the separating member 4 are fixedly connected by welding, a connection between the first housing 5 and the separating member 4 is sealed; the second housing 6 and the separating member 4 are fixedly connected by welding, a connection between the second housing 6 and the separating member 4 is sealed; it should be noted that the above "sealed" can be achieved by welding, or by providing a sealing ring, and the above two sealing methods can make reference to the following description.

Referring to FIG. 1 to FIG. 10, FIG. 1 to FIG. 10 are schematic structural views of a first embodiment of the pump device 100, and the first embodiment of the pump device 100 is described in detail below.

Figure 3:
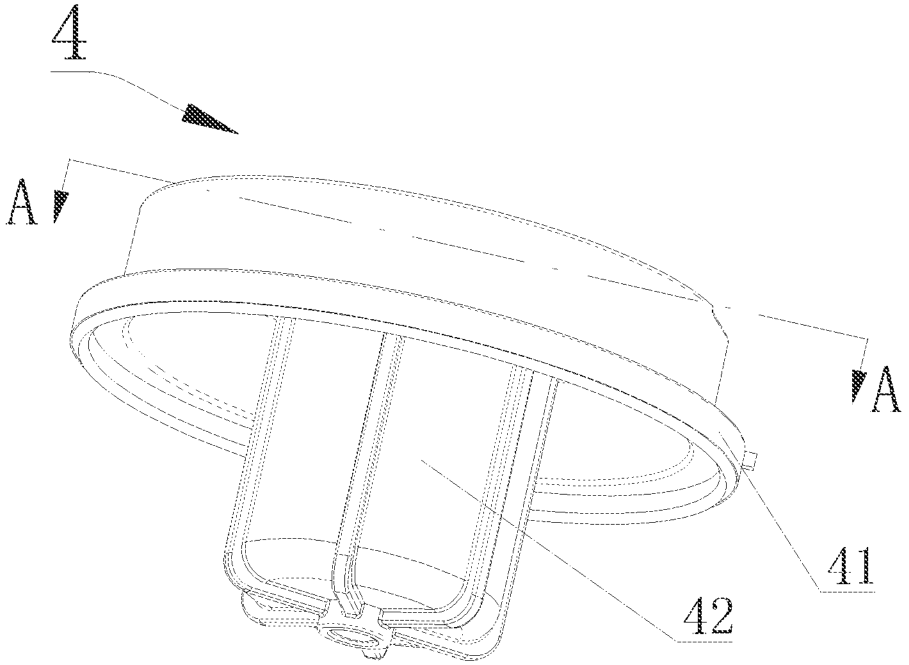
FIG. 3 is a schematic perspective view of a separating member in FIG. 1.
Figure 4:
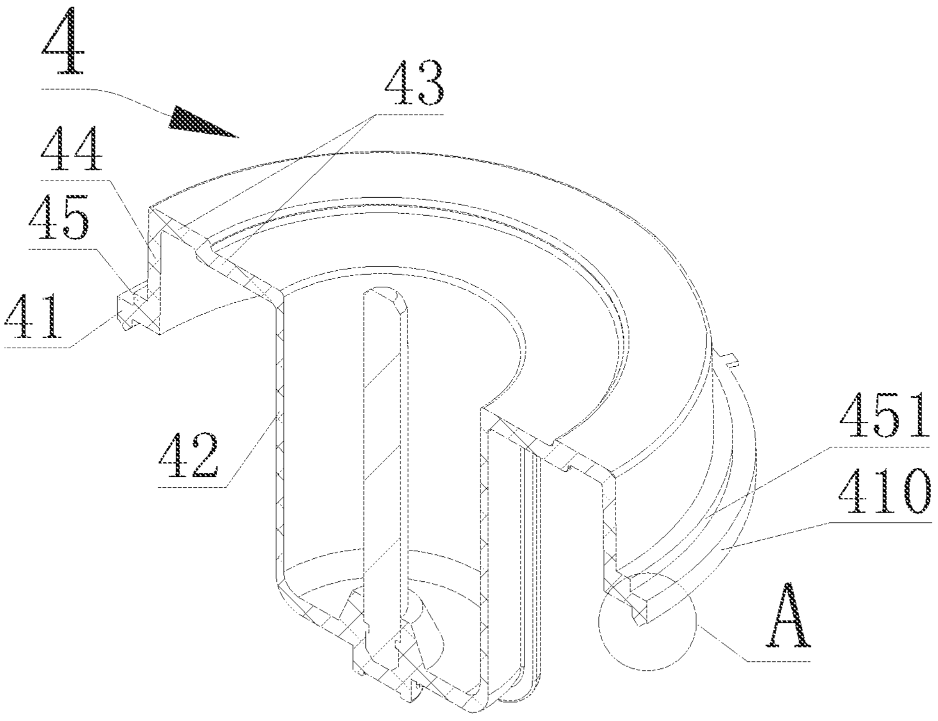
FIG. 4 is a schematic cross-sectional view of the separating member in FIG. 3 taken along line A-A.
Figure 5:
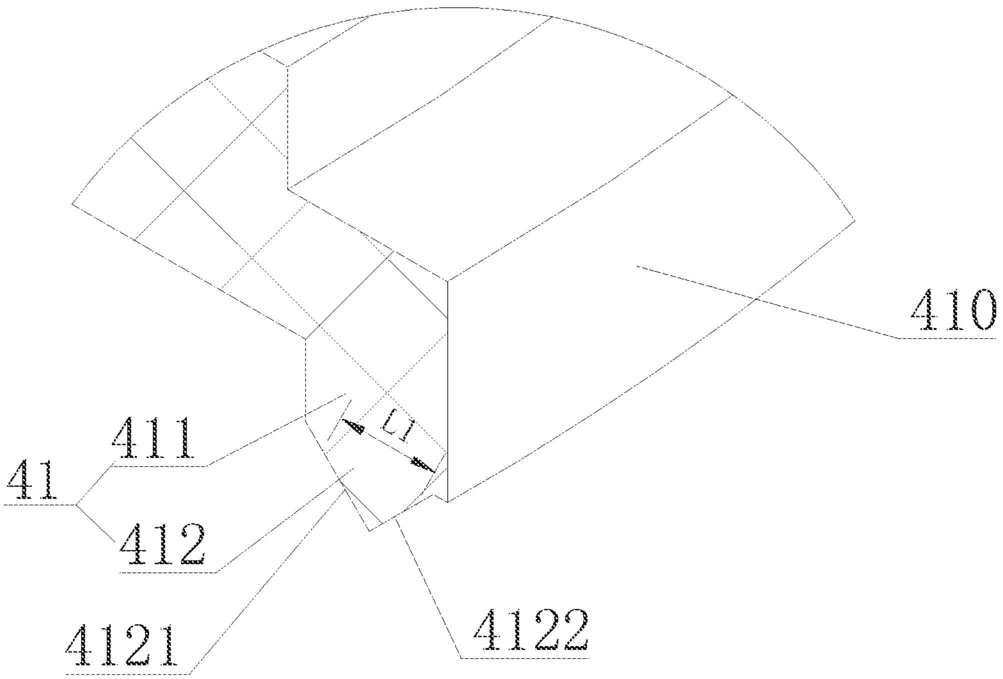
FIG. 5 is a schematic enlarged view of portion A in FIG. 4.

Referring to FIG. 3 to FIG. 5, the separating member 4 includes a first flange portion 41 and a cylinder portion 42, the rotor assembly 1 in FIG. 1 is partially located in a cavity of the cylinder portion 42, the first flange portion 41 extends in a direction away from the cylinder portion 42 along a radial direction of the separating member 4, an outer circumferential side wall 410 of the first flange portion 41 is a free end, the cylinder portion 42 is connected to the first flange portion 41, and the "connection" described here can be direct connection or indirect connection. Specifically, in this embodiment, the cylinder portion 42 is indirectly connected to the first flange portion 41, referring to FIG. 3 and FIG. 5, the separating member 4 further includes a first portion 43 and a second portion 44, the first portion 43 is connected to the second portion 44 and the cylinder portion 42, the second portion 44 is connected to the first portion 43 and the first flange portion 41, the second portion 44 is vertical; certainly, the cylinder portion 42 may be directly connected to the first flange portion 41. Referring to FIG. 2*a*, a portion for welding in the first housing 5 is located above the first flange portion 41, and a portion for welding in the second housing 6 is located below the first flange portion 41. In this way, in case that the sealing of the first inner cavity 80 in FIG. 1 does not meet the requirements, a detection medium in the first inner cavity 80 may be leaked to an outer side of the pump device 100 through a connection between the first housing 5 and the separating member 4, so that the sealing of the first inner cavity 80 can be detected, which is beneficial to improving the accuracy of detecting the sealing of the first inner cavity 80. In case that the sealing of the second inner cavity 90 in FIG. 1 does not meet the requirements, a detection medium in the second inner cavity 90 may be leaked to the outer side of the pump device through a connection between the second housing 6 and the separating member 4, so that the sealing of the second inner cavity can be detected, which is beneficial to improving the accuracy of detecting the sealing of the second inner cavity. Specifically, there are two methods to test the sealing of the second inner cavity 90, the first method is to test the sealing of the second inner cavity 90 after the whole pump is assembled, the second method is to test the sealing of the second inner cavity 90 after the second housing 6, the separating member 4 and the components in the second inner cavity 90 are assembled into a whole. Similarly, there are also two methods to test the sealing of the first inner cavity 80, the first method is to conduct the sealing test of the first inner cavity 80 after the whole pump is assembled, the second method is to conduct the sealing test of the first inner cavity 80 after the first housing 5, the separating member 4 and the components in the first inner cavity 80 are assembled into a whole. If the second test methods described above are respectively used to test the sealing of the second inner cavity 90 and to test the sealing of the first inner cavity 80, since the separating member 4 is partially embedded in the second housing 6 along an axial direction of the pump device 100, the set distance is provided between the first housing 5 and the second housing 6 or the first housing 5 is arranged in contact with the second housing 6, and the portion for welding in the first housing 5 is located above the first flange portion 41, and the portion for welding in the second housing 6 is located below the first flange portion 41, and thus, during testing the sealing of the first inner cavity 80 and the sealing of the second inner cavity 90 of the complete pump, no matter being between the first housing 5 and the second housing 6 or being outside between the first housing 5 and the second housing 6, whether the sealing of the first inner cavity 80 or the sealing of the second inner cavity 90 meet the requirements can be both detected, so that the sealing detection for the first inner cavity and the second inner cavity can be realized on one single device, which is beneficial to saving manufacturing costs and labor costs.

The connection between the second housing 6 and the separating member 4 is described in detail below.

Specifically, referring to FIG. 3 to FIG. 5, in this embodiment, the first flange portion 41 includes a first body portion 411 and a first welding portion 412, the first body portion 411 is connected to the first welding portion 412, and the "connection" here can be direct connection or indirect connection. Specifically, in this embodiment, the first body portion 411 is directly connected to the first welding portion 412, the first welding portion 412 protrudes from a lower surface of the first body portion 411, the first welding portion 412 is arranged in contact with the second housing 6. In this embodiment, at least part of the first welding portion 412 is fused with the second housing 6 by melting the at least part of the first welding portion 412, so that the separating member 4 and the second housing 6 are fixedly connected.

Figure 6:
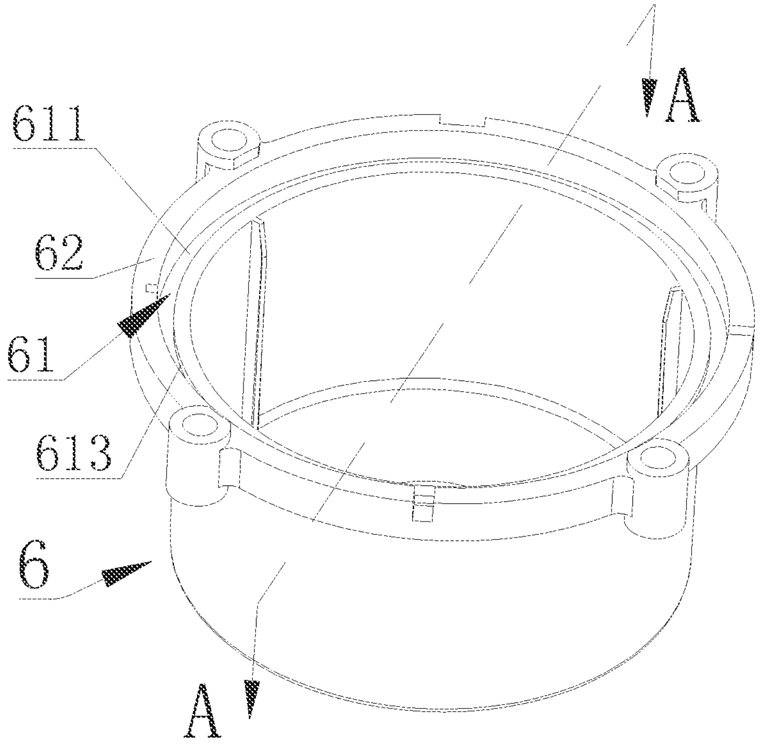
FIG. 6 is a schematic perspective view of a second housing in FIG. 1.
Figure 7:
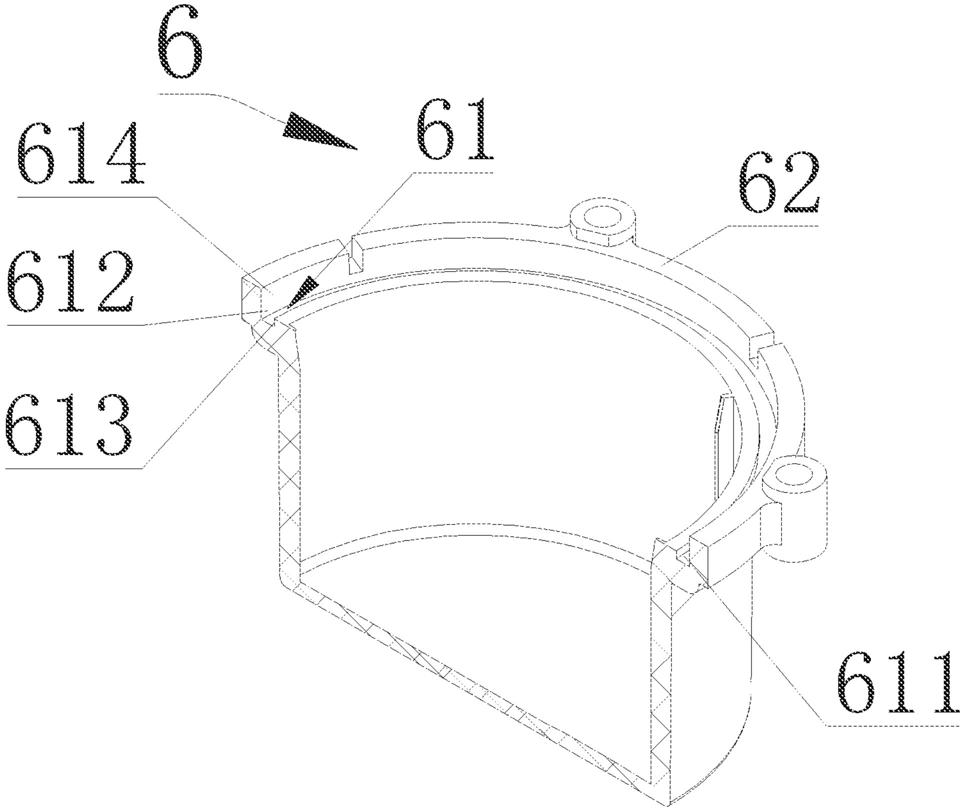
FIG. 7 is a schematic cross-sectional view of the second housing in FIG. 6 taken along line A-A.

Referring to FIG. 6 and FIG. 7, the second housing 6 has a first groove 61, the first groove 61 is recessed downward in a direction parallel to a height direction of the second housing 6; and referring to FIG. 2*a*, FIG. 5 and FIG. 7, the first welding portion 412 is completely located in the first groove 61, the first welding portion 412 is arranged in contact with a corresponding bottom surface of the first groove 61. Referring to FIG. 2*a*, a connection between the first welding portion 412 and the first body portion 411 is defined as a first connection; and referring to FIG. 2*a*, FIG. 6 and FIG. 7, in this embodiment, the first connection is located above the bottom surface 611 of the first groove 61. Referring to FIG. 2*a* and FIG. 2*b*, a space between the first connection and the bottom surface 611 of the first groove 61 is filled with a solder coming from the melted first welding portion 412. Referring to FIG. 2*a*, the separating member 4 is partially arranged in the second housing 6. Specially, the first flange portion 41 of the separating member 4 is arranged in the second housing 6. Further, referring to FIG. 2*a*, in this embodiment, the first flange portion 41 of the separating member 4 is partially located in the first groove 61. Referring to FIG. 2*a*, FIG. 6 and FIG. 7, along the height direction of the second housing 6, in this embodiment, an open end of the first groove 61 is located below an upper end surface 62 of the second housing 6, a first inner side surface 614 of the second housing 6 is directly connected with an outer side surface 612 of the first groove 61, the first inner side surface 614 of the second housing 6 and the outer side surface 612 of the first groove 61 are located in a same plane. Certainly, the first inner side surface 614 of the second housing 6 may be indirectly connected with the outer side surface 612 of the first groove 61, and the first inner side surface 614 of the second housing 6 and the outer side surface 612 of the first groove 61 are not in a same plane in this case. Referring to FIG. 2*a*, in this embodiment, an outer side surface 4111 of the first body portion 411 is located on an inner side of the first inner side surface 614 of the second housing 6.

Figure 2C:
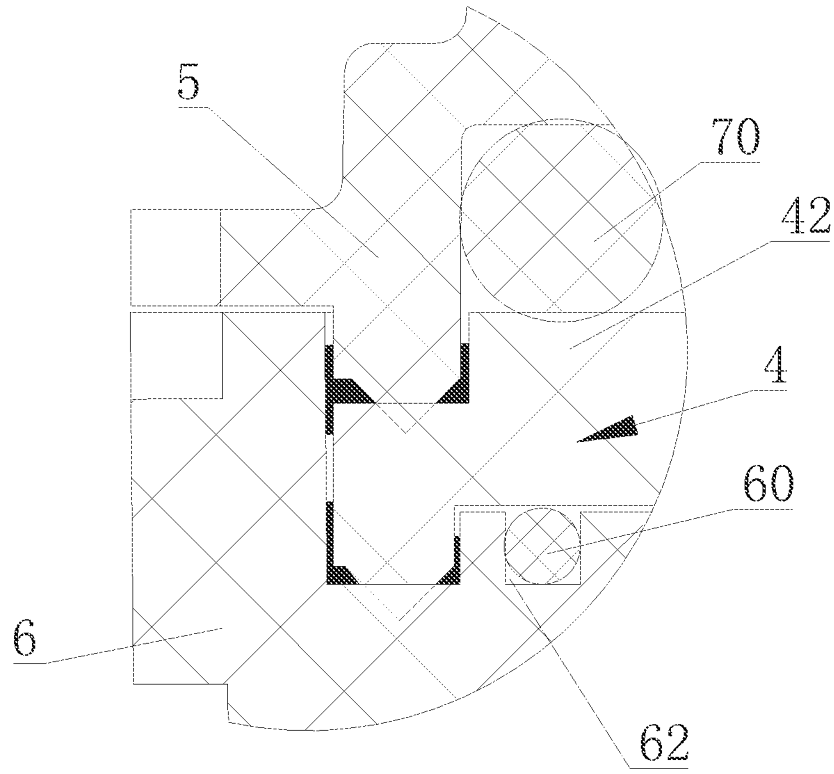
FIG. 2*c* is schematic enlarged view of a second embodiment of portion A in FIG. 1 in the welded state.

Referring to FIG. 1, in this embodiment, the connection between the second housing 6 and the separating member 4 is sealed, so that the external medium cannot flow into the second inner cavity 90 from the connection between the second housing 6 and the separating member 4, and the medium inside the second inner cavity 90 may not flow out from the connection between the second housing 6 and the separating member 4. There are two ways of sealing arrangement, referring to FIG. 2*a* and FIG. 2*b*, the first way is that: the first body portion 411 is located in the first groove 61; in this embodiment, a space between the outer side surface 4111 of the first body portion 411 and the outer side surface 612 of the first groove 61 and a space between an inner side surface 4112 of the first body portion 411 and an inner side surface 613 of the first groove 61 are filled with a solder coming from the melted first welding portion 412, and a top surface of the solder is located above the connection between the first welding portion 412 and the first body portion 411, which is beneficial to improving the sealing reliability of the connection between the second housing 6 and the separating member 4. Certainly, at least one of the space between the outer side surface 4111 of the first body portion 411 and the outer side surface 612 of the first groove 61 and the space between the inner side surface of the first body portion 411 and the inner side surface 613 of the first groove 61 is filled with the solder coming from the melted first welding portion 412, in this way, the welding between the second housing 6 and the separating member 4 can not only be used for fixed connection, but also function for sealing. Referring to FIG. 2*c*, the second way is that: the pump device 100 further includes a first sealing ring 60, the second housing 6 has an accommodating groove 62, the first sealing ring 60 is located in the accommodating groove 62, a lower end of the first sealing ring 60 is in contact with a bottom surface of the accommodating groove 62, an upper end of the first sealing ring 60 is in contact with the separating member 4, the first sealing ring 60 is closer to a central axis of the pump device 100 than a welding position between the separating member 4 and the second housing 6 along a radial direction of the pump device 100. The separating member 4 exerts a positive pressure on the first sealing ring 60 to deform the first sealing ring 60, so that the connection between the separating member 4 and the second housing 6 is sealed. That is, in this way, the welding between the second housing 6 and the separating member 4 is used for fixed connection, and the first sealing ring 60 performs a function of sealing.

Referring to FIG. 4 and FIG. 5, the first welding portion 412 includes a first inclined surface 4121 and a second inclined surface 4122, a root of the first inclined surface 4121 is a connection portion between the first inclined surface 4121 and the first body portion 411, a root of the second inclined surface 4122 is a connection portion between the second inclined surface 4122 and the first body portion 411, a head of the first inclined surface 4121 and a head of the second inclined surface 4122 are in contact with the bottom surface of the first groove 61; in this embodiment, a horizontal distance L1 between the first inclined surface 4121 and the second inclined surface 4122 gradually decreases from the root of the first inclined surface 4121 to the head of the first inclined surface 4121. Referring to FIG. 1 to FIG. 2*b*, a reference plane is defined, the reference plane coincides with the central axis of the pump device 100, a cross section of the pump device 100 is taken along the reference plane and passing through the first welding portion 412, the cross section of the pump device 100 is projected orthogonally in a direction parallel to the reference plane, that is, as shown in FIG. 1, the cross section of the pump device 100 in FIG. 1 can be regarded as the reference plane described above, and an extension line of the head of the first inclined surface 4121 and an extension line of the head of the second inclined surface 4122 intersect at a point O1 in a projection of the cross section of the pump device 100, which is beneficial to welding.

The connection between the separating member 4 and the first housing 5 in this embodiment is described in detail below.

Figure 8:
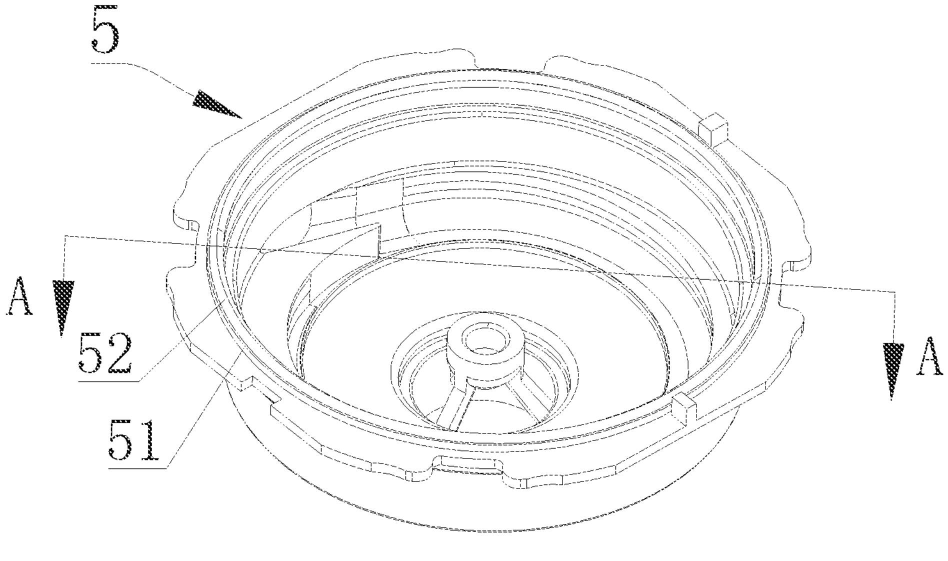
FIG. 8 is a schematic perspective view of a first housing in FIG. 1.
Figure 9:
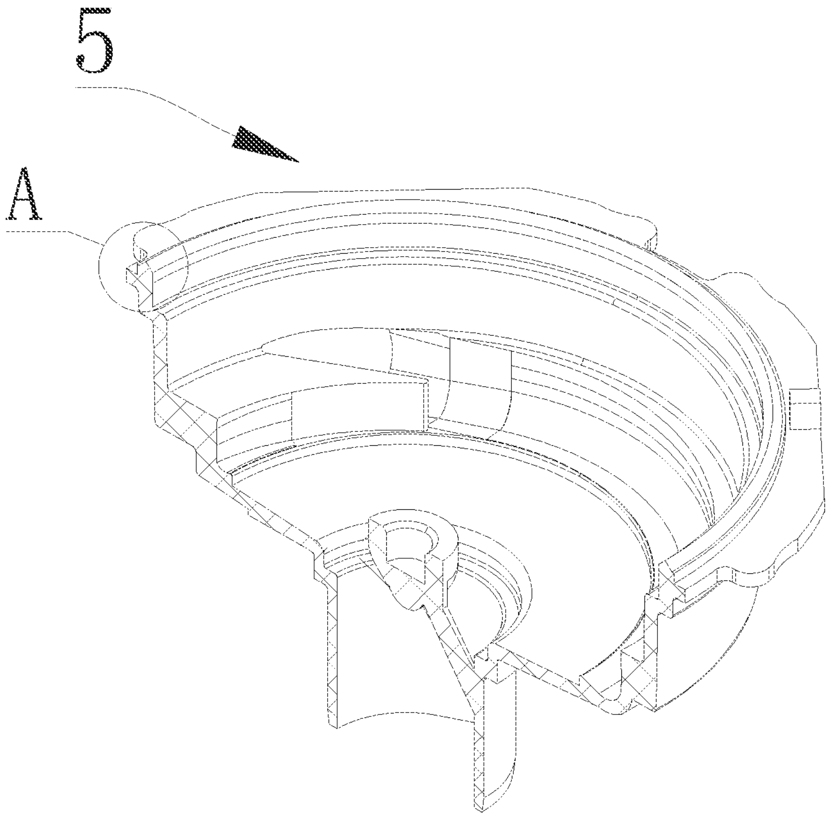
FIG. 9 is a schematic cross-sectional view of the first housing in FIG. 8 taken along line A-A.
Figure 10:
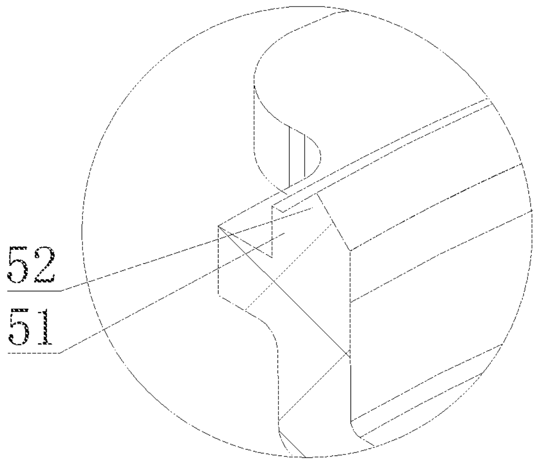
FIG. 10 is a schematic enlarged view of portion A in FIG. 9.
Figure 11:
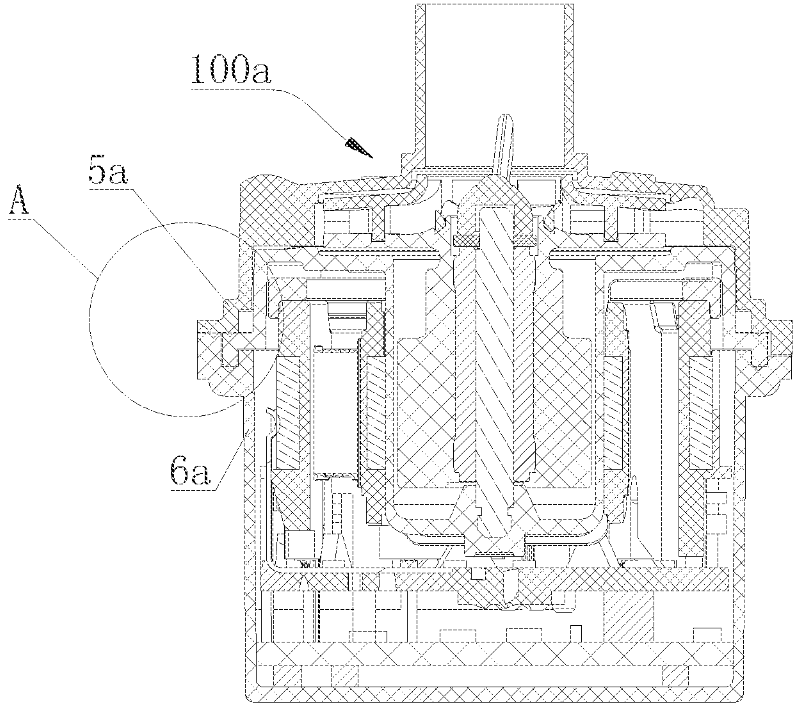
FIG. 11 is a schematic cross-sectional view of a second embodiment of the pump device provided according to the present disclosure.
Figure 12:
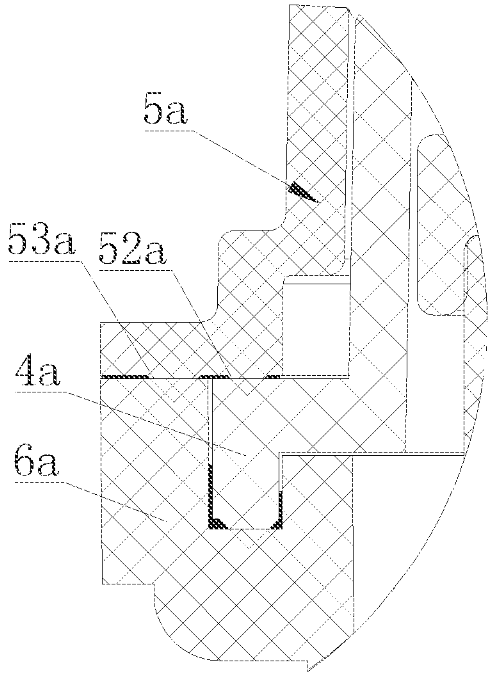
FIG. 12 is a schematic enlarged view of portion A in FIG. 11 in the welded state.

Referring to FIG. 8 to FIG. 10, the first housing 5 includes a second body portion 51 and a second welding portion 52, the second body portion 51 is connected to the second welding portion 52. Here, the "connection" can be direct connection or indirect connection. Specifically, in this embodiment, the second body portion 51 is directly connected to the second welding portion 52. Referring to FIG. 8 and FIG. 10, the second welding portion 52 protrudes from an end surface of the second body portion 51 in a direction parallel to the height direction of the second housing 6; the second welding portion 52 is arranged in contact with the separating member 4; in this embodiment, part of the second welding portion 52 is fused with the separating member 4 by melting at least part of the second welding portion 52, so that the separating member 4 and the first housing 5 are fixedly connected. In addition, in this embodiment, the second welding portion 52 is provided along a circumferential direction of the first housing 5 in a full circle.

Referring to FIG. 1 to FIG. 2*c*, in this embodiment, the connection between the separating member 4 and the first housing 5 is sealed, so that the external medium cannot flow into the first inner cavity 80 through the connection between the separating member 4 and the first housing 5, and the medium inside the first inner cavity 80 cannot flow out from the connection between the separating member 4 and the first housing 5. There are two ways of sealing arrangement, the first way is that: referring to FIG. 4, the separating member 4 further includes a second flange portion 45, an outer edge of the second flange portion 45 is closer to a central axis of the separating member 4 than an outer edge of the first flange portion 41, the second flange portion 45 is connected to the second portion 44 and the first flange portion 41, and the second flange portion 45 is located above the first flange portion 41; referring to FIG. 2*a*, the pump device 100 has a second groove 50, side walls corresponding to the second groove 50 include an outer side surface 451 of the second flange portion 45 and the first inner side surface 614 of the second housing 6, the second welding portion 52 is located in the second groove 50 and is in contact with a bottom surface of the second groove 50; in this embodiment, the bottom surface of the second groove 50 is an upper surface of the first body portion 411. Referring to FIG. 2*a* and FIG. 2*b*, the whole second body portion 51 is extended into the second groove 50. Certainly, the second body portion 51 is partially extended into the second groove 50. Referring to FIG. 2*b*, a connection between the second welding portion 52 and the second body portion 51 is defined as a second connection, a space between the second connection and the bottom surface of the second groove 50 is filled with a solder coming from the melted second welding portion 52, a space between an outer side surface of the second body portion 51 and the outer side surface of the first groove 61 and a space between an inner side surface of the second body portion 51 and the outer side surface of the second flange portion 45 are filled with the solder coming from the melted second welding portion 52, a top surface of the solder is located above the connection portion between the second welding portion 52 and the second body portion 51. Certainly, at least one of the space between the outer side surface of the second body portion 51 and the outer side surface of the first groove 61 and the space between the inner side surface of the second body portion 51 and the outer side surface of the second flange portion 45 is filled with the solder coming from the melted second welding portion 52, which is beneficial to improving the sealing reliability of the connection between the first housing 5 and the separating member 4. In this way, the welding between the first housing 5 and the separating member 4 can be not only used for fixed connection, but also can perform a function of sealing. The second way is that: referring to FIG. 2*c* and FIG. 4, the pump device 100 further includes a second sealing ring 70, the second sealing ring 70 is sleeved on an outer circumferential side wall of the second portion 44 of the separating member 4, a lower end of the second sealing ring 70 abuts against the second flange portion 45, and an upper end of the second sealing ring 70 abuts against the first housing 5. Here, the term "abut" can be in a direct abutment or an indirect abutment. Specifically, in this embodiment, the direct abutment is used. Certainly, when the second flange portion 45 is not provided, the second sealing ring 70 may abut against the first flange portion 41. Referring to FIG. 2*c*, in this embodiment, the first housing 5 exerts a positive pressure on the second sealing ring 70 to deform the second sealing ring 70, so that the connection between the separating member 4 and the first housing 5 is sealed. In this way, in this embodiment, the welding between the first housing 5 and the separating member 4 is used for fixed connection, and the second sealing ring 70 performs a function of sealing.

Referring to FIG. 11 to FIG. 15, FIG. 11 to FIG. 15 are schematic structural views of a second embodiment of the pump device 100*a* according to the present disclosure, and the second embodiment of the pump device 100*a* is described in detail below.

Figure 13:
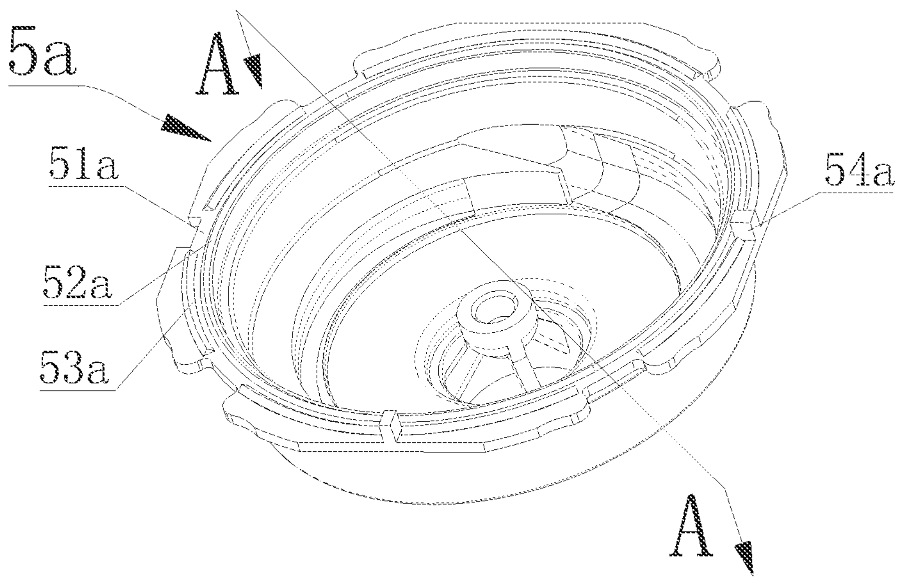
FIG. 13 is a schematic perspective view of the first housing in FIG. 11.
Figure 14:
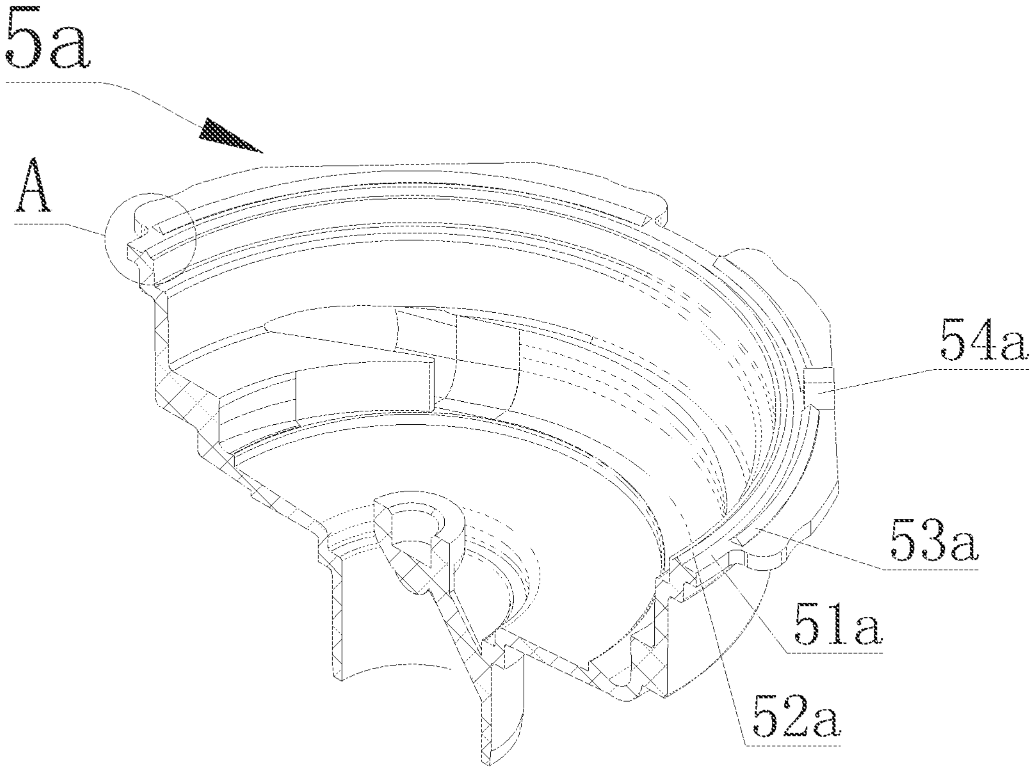
FIG. 14 is a schematic cross-sectional view of the first housing in FIG. 13 taken along line A-A.
Figure 15:
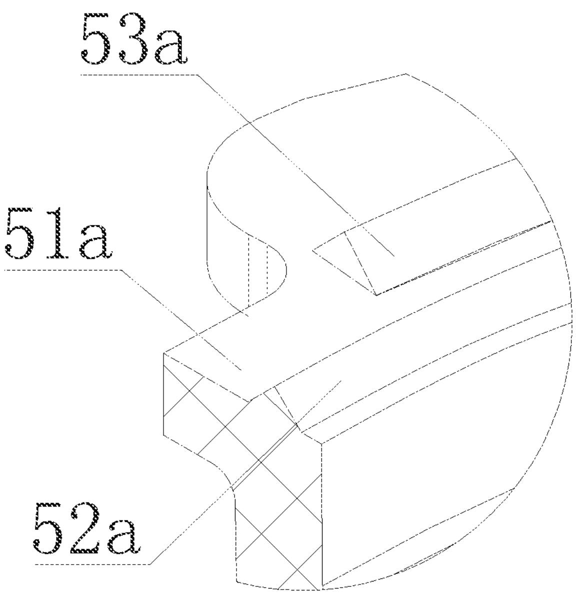
FIG. 15 is a schematic enlarged view of portion A in FIG. 14.

Referring to FIG. 11 to FIG. 15, in this embodiment, the first housing 5*a* includes the second body portion 51*a*, the second welding portion 52*a* and at least one third welding portion 53*a*, the second welding portion 52*a* is connected to the second body portion 51*a*, the at least one third welding portion 53*a* is connected to the second body portion 51*a*. Here, the term "connect" can be direct connection or indirect connection. Specifically, in this embodiment, the second welding portion 52*a* is directly connected to the second body portion 51*a*, and the at least one third welding portion 53*a* is directly connected to the second body portion 51*a*. Referring to FIG. 14 and FIG. 15, in a direction parallel to a height direction of the first housing 5*a*, the second welding portion 52*a* protrudes from the end surface of the second body portion 51*a*, the at least one third welding portion 53*a* protrudes from the end surface of the second body portion 51*a*, the at least one third welding portion 53*a* is arranged closer to an outer edge of the first housing 5*a* than the second welding portion 52*a*, and the at least one third welding portion 53*a* is arranged on an outer periphery of the second welding portion 52*a*. The second welding portion 52*a* is arranged in contact with the separating member 4*a*, and the at least one third welding portion 53*a* is arranged in contact with the second housing 6*a*. In this embodiment, the connection between the first housing 5*a* and the separating member 4*a* is sealed by melting part of the second welding portion 52*a*, and the connection between the first housing 5*a* and the second housing 6*a* is sealed by melting part of the third welding portion 53*a*. In addition, in this embodiment, the first housing 5*a* includes multiple third welding portions 53*a*, where two adjacent third welding portions 53*a* are non-consecutive. Certainly, the first housing 5*a* may include one third welding portion 53*a*, and the third welding portion 53*a* is provided along the circumferential direction of the first housing 5*a* in a full circle or locally.

Figure 16:
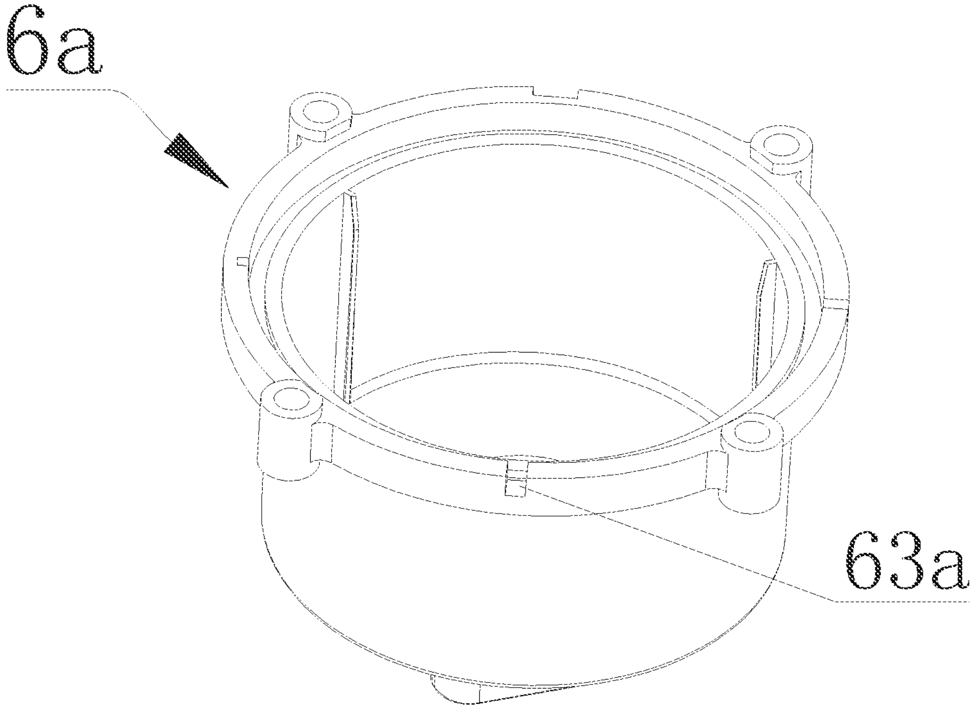
FIG. 16 is a schematic perspective view of the second housing in FIG. 11.
Figure 17:
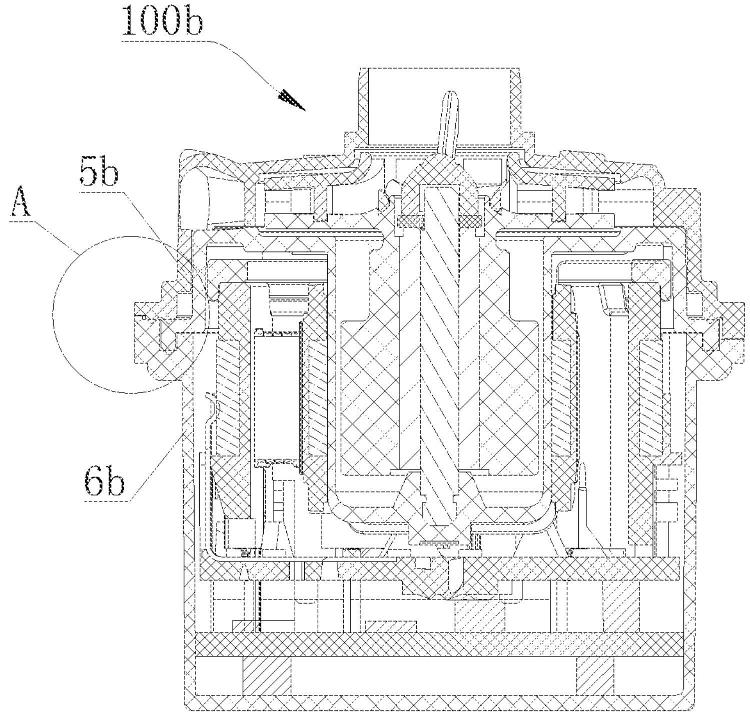
FIG. 17 is a schematic cross-sectional structural view of a third embodiment of the pump device provided according to the present disclosure.
Figure 18:
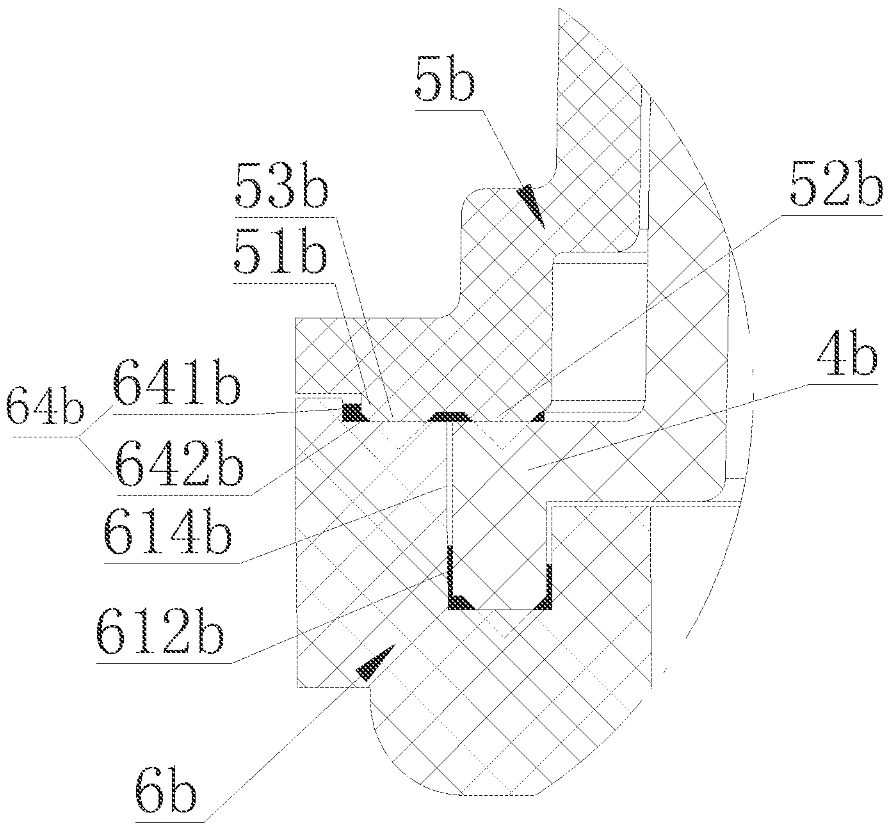
FIG. 18 is a schematic enlarged view of portion A in FIG. 17 in the welded state.

Referring to FIG. 13 and FIG. 14, in this embodiment, the first housing 5*a* further includes at least one blocking portion Ma, the at least one blocking portion Ma protrudes from the end surface of the second body portion 51*a*, a protruding height of the at least one blocking portion 54*a* is greater than a protruding height of the second welding portion 52*a* and a protruding height of the third welding portions 53*a*. Each blocking portion 54*a* is located between two adjacent third welding portions 53*a*. The at least one blocking portion 54*a* is located on an outer side of the second welding portion 52*a* along a radial direction of the first housing 5*a*. Referring to FIG. 16, the second housing 6*a* includes a recess 63*a*, the recess 63*a* is recessed from an end surface of the second housing 6*a* in a direction parallel to the height direction of the second housing 6*a*; in this embodiment, the at least one blocking portion 54*a* is located in a cavity of the corresponding recess 63*a* and is matched with the corresponding recess 63*a*. In this way, on one hand, the matching arrangement between the blocking portion 54*a* and the recess 63*a* is beneficial to positioning the separating member 4*a*; on the other hand, the blocking portion 54*a* is located between two adjacent third welding portions 53*a*, and the blocking portion 54*a* is located on the outer side of the second welding portion 52*a* along the radial direction of the first housing 5*a*, so that the blocking portion 53*a* can block the solder coming from the melted second welding portion 52*a* from flowing outward, and thus the solder coming from the melted second welding portion 52*a* can be filled between the second welding portion 52*a* and the blocking portion 54*a*, which is beneficial to shortening the flow path of the solder coming from the melted second welding section 52*a* to flow outward, and thus is beneficial to improving the sealing reliability of the second welding section 52*a*.

Compared with the first embodiment of the pump device according to the present disclosure, in this embodiment, the first housing 5*a* further includes at least one third welding portion 53*a* which is arranged on the outer periphery of the second welding portion 52*a*, the third welding portion 53*a* is arranged closer to the outer edge of the first housing 5*a* than the second welding portion 52*a*; so that the third welding portion 52*a* can block the solder coming from the melted second welding portion 52*a* from flowing outward, and the solder coming from the melted second welding portion 52*a* can be filled between the second welding portion 52*a* and the third welding portion 53*a*, which is beneficial to shortening the flow path of the solder coming from the melted second welding section 52*a* to flow outward, and thus is beneficial to improving the sealing reliability of the second welding section 52*a*. In this embodiment, other structural features of the pump device can make reference to the first embodiment of the pump device, which is not repeated here.

Referring to FIG. 17 to FIG. 23, FIG. 17 to FIG. 23 are schematic structural views of a third embodiment of the pump device 100*b* according to the present disclosure, and the third embodiment of the pump device 100*b* is described in detail below.

Figure 19:
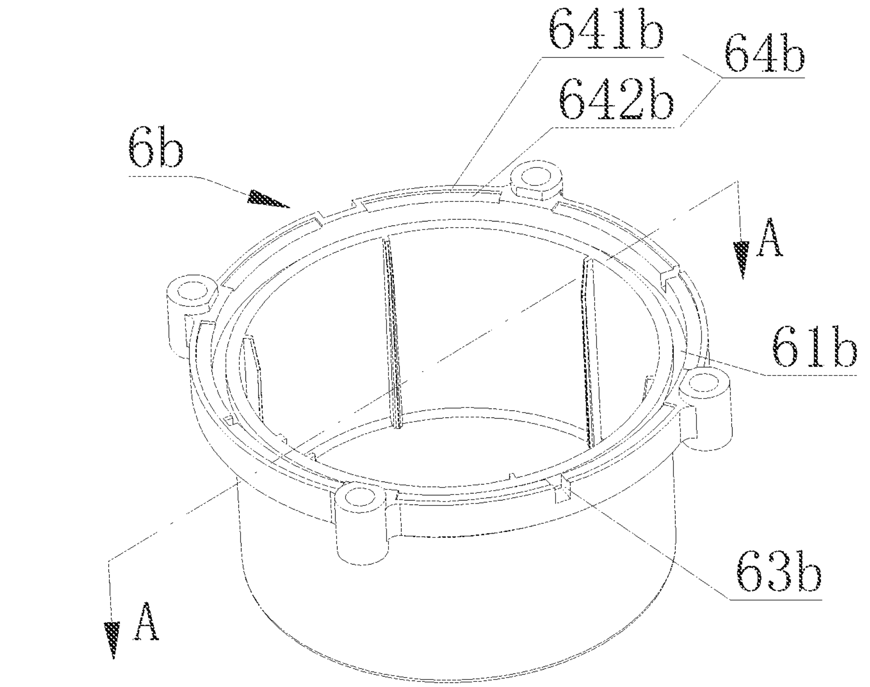
FIG. 19 is a schematic perspective view of the second housing in FIG. 17.
Figure 20:
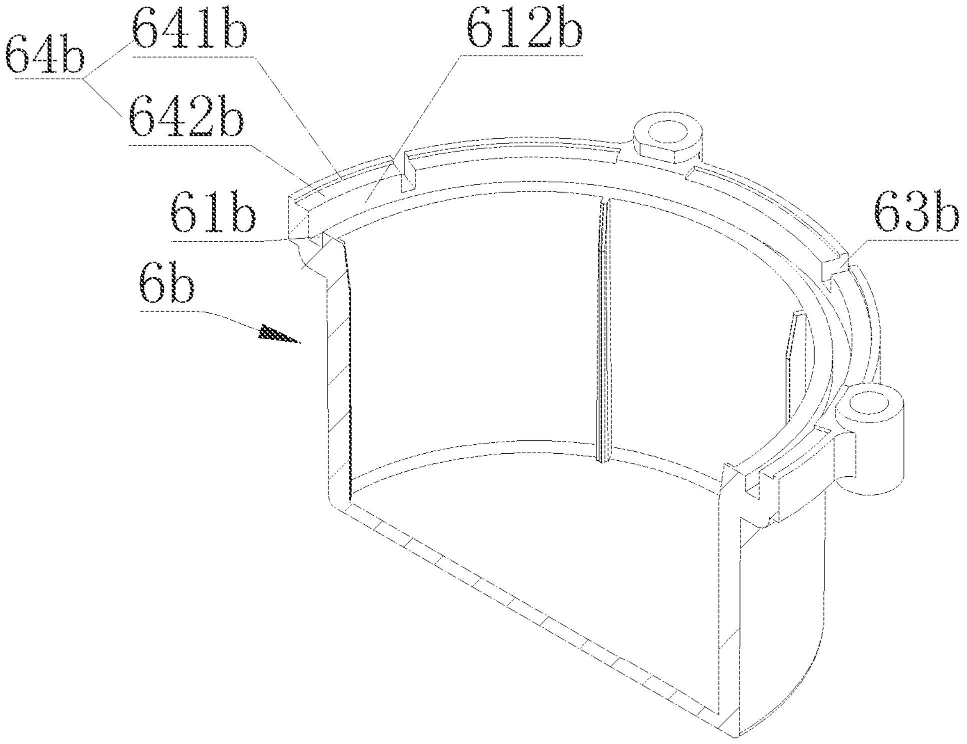
FIG. 20 is a schematic cross-sectional view of the second housing in FIG. 19 taken along line A-A.
Figure 21:
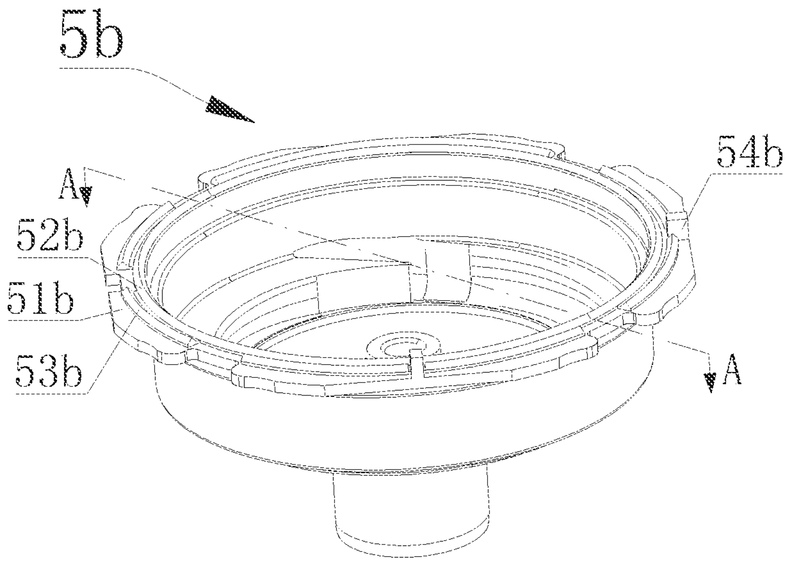
FIG. 21 is a schematic perspective view of the first housing in FIG. 17.
Figure 22:
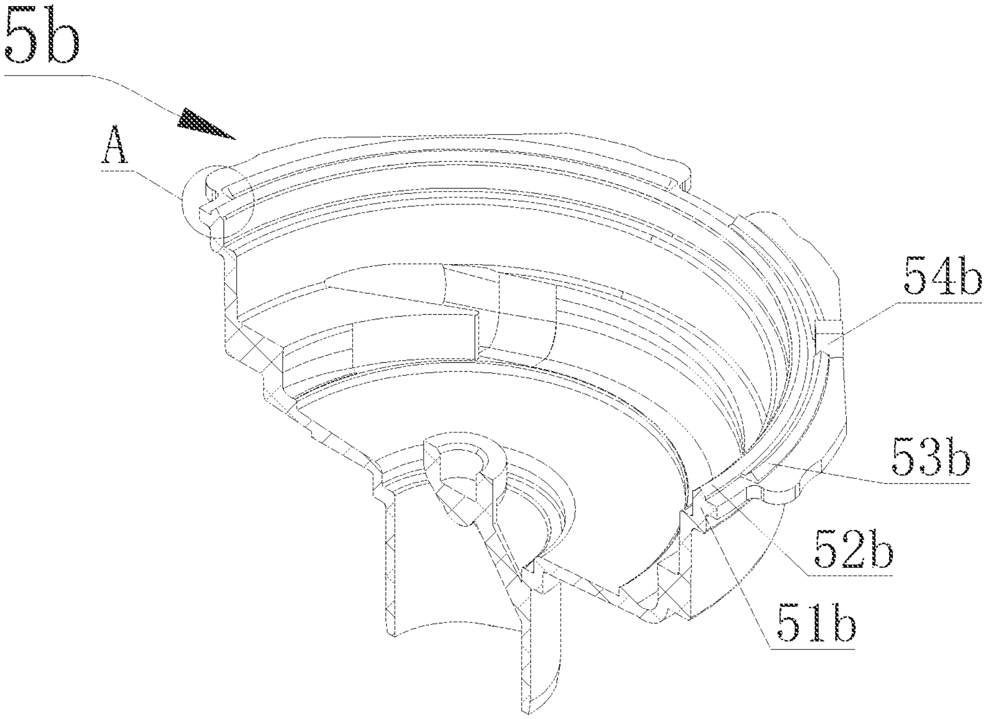
FIG. 22 is a schematic cross-sectional view of the first housing in FIG. 21 taken along line A-A.
Figure 23:
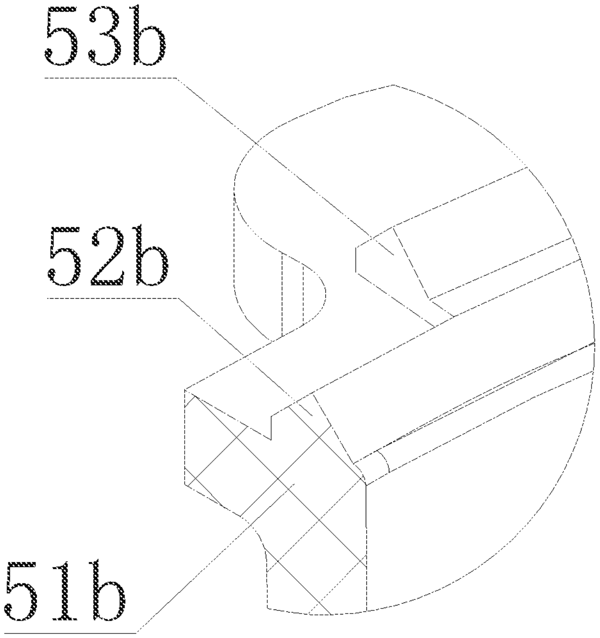
FIG. 23 is a schematic enlarged view of portion A in FIG. 22.

Referring to FIG. 21 and FIG. 22, in this embodiment, the first housing 5*b* includes the second body portion 51*b*, the second welding portion 52*b* and at least one third welding portion 53*b*, the second welding portion 52*b* is connected to the second body portion 51*b*, the at least one third welding portion 53*b* is connected to the second body portion 51*b*, and the "connection" here can be direct connection or indirect connection. Specifically, in this embodiment, the second welding portion 52*b* is directly connected to the second body portion 51*b*, and the at least one third welding portion 53*b* is directly connected to the second body portion 51*b*. Referring to FIG. 18 to FIG. 23, the second welding portion 52*b* protrudes from the end surface of the second body portion 51*b* in a direction parallel to a height direction of the first housing 5*a*, the at least one third welding portion 53*b* protrudes from the end surface of the second body portion 51*b*, the at least one third welding portion 53*b* is arranged closer to an outer edge of the first housing 5*b* than the second welding portion 52*b*, and the at least one third welding portion 53*b* is arranged on an outer periphery of the second welding portion 52*b*. The second welding portion 52*b* is arranged in contact with the separating member 4*b*, and the at least one third welding portion 53*b* is arranged in contact with the second housing 6*b*. In this embodiment, the connection between the first housing 5*b* and the separating member 4*b* is sealed by melting part of the second welding portion 52*b*, and the connection between the first housing 5*b* and the second housing 6*b* is sealed by melting part of the third welding portion 53*b*. In addition, in this embodiment, the first housing 5*b* includes multiple third welding portions 53*b*, and two adjacent third welding portions 53*b* are nonconsecutive. Certainly, the first housing 5*b* may include one third welding portion 53*b*, and the third welding portion 53*b* is provided along the circumferential direction of the first housing 5*b* in a full circle or locally.

Referring to FIG. 17 to FIG. 20, in this embodiment, the second housing 6*b* further includes a step portion 64*b*, a side surface 641*b* of the step portion 64*b* is farther away from the central axis of the pump device 100*b* than the outer side surface 612*b* of the first groove 61*b*, the side surface 641*b* of the step portion 64*b* is connected to an upper end surface 62*b* of the second housing 6*b* and a bottom surface 642*b* of the step portion, the bottom surface 642*b* of the step portion 64*b* is connected to the first inner side surface 614*b* of the second housing 6*b* and the side surface 641*b* of the step portion 64*b*; the third welding portions 53*b* are closer to the central axis of the pump device 100*b* than the side surface 641*b* of the step portion 64*b* along the radial direction of the pump device 100*b*. The third welding portions 53*b* are in contact with the bottom surface 642*b* of the step portion 64*b*, the second welding portion 52*b* is in contact with the separating member 4*b*; and connections between the third welding portions 53*b* and the second body portion 51*b* are located on one side of the side surface 641*b* of the step portion 64*b*.

Referring to FIG. 21 and FIG. 22, in this embodiment, the first housing 5*b* further includes at least one blocking portion 54*b*, the at least one blocking portion 54*b* protrudes from the end surface of the second body portion 51*b*, a protruding height of the at least one blocking portion 54*b* is greater than a protruding height of the second welding portion 52*b* and a protruding height of the third welding portions 53*b*. Each blocking portion 54*b* is located between two adjacent third welding portions 53*b*; the at least one blocking portion 54*b* is located on an outer periphery of the second welding portion 52*b* along a radial direction of the first housing 5*b*. Referring to FIG. 19 and FIG. 20, the second housing 6*b* includes a recess 63*b*, the recess 63*b* is recessed from an end surface of the second housing 6*b* in a direction parallel to the height direction of the second housing 6*b*; in this embodiment, the at least one blocking portion 54*b* is located in a corresponding cavity of the recess 63*b* and is correspondingly matched with the recess 63*b*. In this way, on one hand, the matching arrangement between the blocking portion 54*b* and the recess 63*b* is beneficial to positioning the separating member 4*b*; on the other hand, the blocking portion 54*b* is located between two adjacent third welding portions 53*b*, and the blocking portion 54*b* is located on the outer periphery of the second welding portion 52*b* along the radial direction of the first housing 5*b*, so that the blocking portion 53*b* can block the solder coming from the melted second welding portion 52*b* from flowing outward, and the solder coming from the melted second welding portion 52*b* can be filled between the second welding portion 52*b* and the blocking portion 54*b*, which is beneficial to shortening the flow path of the solder coming from the melted second welding section 52*b* to flow outward, and thus is beneficial to improving the sealing reliability of the second welding section 52*b*.

Compared with the second embodiment of the pump device, in this embodiment, the second housing 6*b* further includes the step portion 64*b*, the third welding portions 53*b* are in contact with the bottom surface 641*b* of the step portion 64*b*, and the second welding portion 52*b* is in contact with the separating member 4*b*. In that case, at least part of the solder coming from the melted third welding portion 53*b* can be accommodated in a space between the side surface 641*b* of the step portion 64*b* and the third welding portions 53*b* by providing the step portion 64*b*, which is beneficial to reducing the overflow of the solder coming from the melted third welding portions 53*b* to the outer side of the pump device. Other features of the pump device in this embodiment can make reference to the first embodiment of the pump device, which is not described here.

It should be noted that, the above embodiments are only intended to illustrate the present disclosure and not to limit the technical solutions described in the present disclosure. Although the present specification has been described in detail with reference to the embodiments described above, it should be understood by those skilled in the art that, various modifications and equivalents can be made to the technical solutions of the present disclosure without departing from the spirit and scope of the present disclosure, all of which should be contained within the scope of the claims of the present disclosure.

The invention claimed is:

1. A pump device, comprising: a rotor assembly, a stator assembly and a separating member, wherein the pump device has a first inner cavity and a second inner cavity, the first inner cavity is located on one side of the separating member, the second inner cavity is located on the other side of the separating member, the rotor assembly is located in the first inner cavity, the stator assembly is located in the second inner cavity; wherein the pump device further comprises a first housing and a second housing, the first housing partially covers the rotor assembly, at least part of the second housing surrounds an outer circumference of the stator assembly; the first housing and the separating member are fixedly connected, and the first housing is sealed to the separating member; the second housing and the separating member are fixedly connected, and the second housing is sealed to the separating member; the separating member comprises a first flange portion and a cylinder portion, the cylinder portion is connected to the first flange portion, the rotor assembly is partially located in a cavity of the cylinder portion, and the first flange portion extends in a direction away from the cylinder portion along a radial direction of the separating member;

wherein the first flange portion comprises a first body portion and a first welding portion, the first body portion is connected to the first welding portion, the first welding portion is configured to enable the separating member to be welded to the second housing, and wherein the first housing comprises a second body portion, a second welding portion and at least one third welding portion, the second body portion is connected to the second welding portion, the at least one third welding portion is connected to the second body portion, the second welding portion is configured to enable the first housing to be welded to the separating member, and the at least one third welding portion is configured to enable the first housing to be welded to the second housing.

2. The pump device according to claim 1, wherein the first welding portion protrudes from a lower surface of the first body portion, the first welding portion is arranged in contact with the second housing, and/or the at least one third welding portion protrudes from an end surface of the second body portion in a direction parallel to a height direction of the first housing, the at least one third welding portion is arranged closer to an outer edge of the first housing than the second welding portion, and the at least one third welding portion is arranged on an outer periphery of the second welding portion.

3. The pump device according to claim 2, wherein the second housing has a first groove, the first groove is recessed downward from an upper surface of the second housing along a height direction of the second housing, the first welding portion is completely located in the first groove, the first welding portion is arranged in contact with a bottom surface of the first groove; at least part of the first body portion is located in the first groove, and a top surface of melted first welding portion is located above a connection between the first welding portion and the first body portion, the connection between the first welding portion and the first body portion is located above the bottom surface of the first groove, the connection between the first welding portion and the first body portion is defined as a first connection, and a space between the first connection and the bottom surface of the first groove is filled with a solder coming from the melted first welding portion.

4. The pump device according to claim 3, wherein at least one of a space between an outer side surface of the first body portion and an outer side surface of the first groove and a space between an inner side surface of the first body portion and an inner side surface of the first groove is filled with the melted first welding portion.

5. The pump device according to claim 3, wherein the first welding portion comprises a first inclined surface and a second inclined surface, a root of the first inclined surface and a root of the second inclined surface are located on the first body portion, a head of the first inclined surface and a head of the second inclined surface are in contact with the bottom surface of the first groove; a horizontal distance between the first inclined surface and the second inclined surface gradually decreases from the root of the first inclined surface to the head of the first inclined surface; a reference plane is defined, wherein the reference plane coincides with a central axis of the pump device, a cross section of the pump device is taken along the reference plane and passing through the first welding portion, the cross section of the pump device is projected orthogonally in a direction parallel to the reference plane, and an extension line of the head of the first inclined surface and an extension line of the head of the second inclined surface intersect at a point in a projection of the cross section of the pump device.

6. The pump device according to claim 3, wherein the second welding portion protrudes from the end surface of the second body portion in a direction parallel to the height direction of the first housing, the second welding portion is arranged in contact with the separating member, at least part of the second welding portion is able to be fused with the separating member by melting the at least part of the second welding portion, so that the separating member and the first housing are fixedly connected, and a portion for welding in the first housing is located above the first flange portion.

7. The pump device according to claim 6, wherein along the height direction of the second housing, an open end of the first groove is located below an upper end surface of the second housing, a first inner side surface of the second housing is connected with an outer side surface of the first groove, an outer side surface of the first body portion is located on an inner side of the first inner side surface of the second housing; one end of the second flange portion is connected to the first flange portion, and the second flange portion is located above the first flange portion; a connection between the second welding portion and the second body portion is defined as a second connection, and a space between the second connection and a bottom surface of a second groove is filled with the melted second welding portion.

8. The pump device according to claim 7, wherein at least one of a space between an outer side surface of the second body portion and the outer side surface of the first groove and a space between an inner side surface of the second body portion and the outer side surface of the second flange portion is filled with the melted second welding portion; and a top surface of the melted second welding portion is located above the connection between the second welding portion and the second body portion.

9. The pump device according to claim 8, wherein the first housing comprises two or more third welding portions, two adjacent third welding portions of the two or more third welding portions are non-consecutive; the first housing further comprises at least one blocking portion, the at least one blocking portion protrudes from the end surface of the second body portion, a protruding height of the at least one blocking portion is greater than a protruding height of the second welding portion and a protruding height of the two or more third welding portions; each blocking portion of the at least one blocking portion is located between two adjacent third welding portions; the at least one blocking portion is located on an outer side of the second welding portion along a radial direction of the first housing; the second housing comprises a recess, the recess is recessed from an end surface of the second housing in a direction parallel to the height direction of the second housing, and the at least one blocking portion is located in a cavity of the corresponding recess.

10. The pump device according to claim 9, wherein the second housing further comprises a step portion, a side surface of the step portion is farther away from a central axis of the pump device than the outer side surface of the first groove, the side surface of the step portion is connected to the upper end surface of the second housing and a bottom surface of the step portion, the bottom surface of the step portion is connected to the outer side surface of the first groove and the side surface of the step portion, and the two or more third welding portions are closer to the central axis of the pump device than the side surface of the step portion along a radial direction of the pump device; the two or more third welding portions are in contact with the bottom surface of the step portion, and the second welding portion is in contact with the separating member; and connections between the two or more third welding portions and the second welding portion are located on one side of the side surface of the step portion.

11. The pump device according to claim 1, wherein the pump device further comprises a first sealing ring, the second housing has an accommodating groove, the first sealing ring is located in the accommodating groove, a lower end of the first sealing ring is in contact with a corresponding bottom surface of the accommodating groove, an upper end of the first sealing ring is in contact with the separating member, the first sealing ring is closer to a central axis of the pump device than a welding position between the separating member and the second housing along a radial direction of the pump device, the separating member exerts a positive pressure on the first sealing ring to deform the first sealing ring, so that a connection between the separating member and the second housing is sealed.

12. The pump device according to claim 1, wherein the separating member further comprises a first portion and a second portion, the first portion is connected to the second portion and the cylinder portion, the second portion is connected to the first portion and the first flange portion, the second portion is vertical; the pump device further comprises a second sealing ring, the second sealing ring is sleeved on an outer circumferential side wall of the second portion, a lower end of the second sealing ring abuts against the first flange portion, an upper end of the second sealing ring abuts against the first housing, and the first housing exerts a positive pressure on the second sealing ring to deform the second sealing ring, so that a connection between the separating member and the first housing is sealed.

13. The pump device according to claim 1, wherein the second welding portion protrudes from an end surface of the second body portion in a direction parallel to a height direction of the first housing, the second welding portion is arranged in contact with the separating member, at least part of the second welding portion is able to be fused with the separating member by melting the at least part of the second welding portion, so that the separating member and the first housing are fixedly connected, and a portion for welding in the first housing is located above the first flange portion.

14. A pump device, comprising: a rotor assembly, a stator assembly and a separating member, wherein the pump device has a first inner cavity and a second inner cavity, the first inner cavity is located on one side of the separating member, the second inner cavity is located on the other side of the separating member, the rotor assembly is located in the first inner cavity, the stator assembly is located in the second inner cavity; wherein the pump device further comprises a first housing and a second housing, the first housing partially covers the rotor assembly, at least part of the second housing surrounds an outer circumference of the stator assembly; the first housing and the separating member are fixedly connected, and the first housing is sealed to the separating member; the second housing and the separating member are fixedly connected, and the second housing is sealed to the separating member; the separating member comprises a first flange portion and a cylinder portion, the cylinder portion is connected to the first flange portion, the rotor assembly is partially located in a cavity of the cylinder portion, and the first flange portion extends in a direction away from the cylinder portion along a radial direction of the separating member;

the first flange portion comprises a first body portion and a first welding portion, the first body portion is connected to the first welding portion, the first welding portion is configured to enable the separating member to be welded to the second housing;

the first housing comprises a second body portion and a second welding portion, the second body portion is connected to the second welding portion, the second welding portion is configured to enable the first housing to be welded to the separating member; and the pump device further comprises a first sealing ring and/a second sealing ring, the first sealing ring is configured to seal between the separating member and the second housing, and the second sealing ring is configured to seal between the separating member and the first housing.

15. The pump device according to claim 14, wherein the second housing has an accommodating groove, the first sealing ring is located in the accommodating groove, a lower end of the first sealing ring is in contact with a corresponding bottom surface of the accommodating groove, an upper end of the first sealing ring is in contact with the separating member, the first sealing ring is closer to a central axis of the pump device than a welding position between the separating member and the second housing along a radial direction of the pump device, the separating member exerts a positive pressure on the first sealing ring to deform the first sealing ring, so that a connection between the separating member and the second housing is sealed, and/or the separating member further comprises a first portion and a second portion, the first portion is connected to the second portion and the cylinder portion, the second portion is connected to the first portion and the first flange portion, the second portion is vertical; the second sealing ring is sleeved on an outer circumferential side wall of the second portion, a lower end of the second sealing ring abuts against the first flange portion, and an upper end of the second sealing ring abuts against the first housing, and the first housing exerts a positive pressure on the second sealing ring to deform the second sealing ring, so that a connection between the separating member and the first housing is sealed.

16. A pump device, comprising: a rotor assembly, a stator assembly and a separating member, wherein the pump device has a first inner cavity and a second inner cavity, the first inner cavity is located on one side of the separating member, the second inner cavity is located on the other side of the separating member, the rotor assembly is located in the first inner cavity, the stator assembly is located in the second inner cavity; wherein the pump device further comprises a first housing and a second housing, the first housing partially covers the rotor assembly, at least part of the second housing surrounds an outer circumference of the stator assembly; the first housing and the separating member are fixedly connected, and the first housing is sealed to the separating member; the second housing and the separating member are fixedly connected, and the second housing is sealed to the separating member; the separating member comprises a first flange portion and a cylinder portion, the cylinder portion is connected to the first flange portion, the rotor assembly is partially located in a cavity of the cylinder portion, and the first flange portion extends in a direction away from the cylinder portion along a radial direction of the separating member;

the second housing has a first groove, the first groove is recessed downward from an upper surface of the second housing along a height direction of the second housing, and the first housing comprises a second body portion, a second welding portion and at least one third welding portion, the second body portion is connected to the second welding portion, and the at least one third welding portion is connected to the second body portion.

17. The pump device according to claim 16, wherein the at least one third welding portion protrudes from the end surface of the second body portion in a direction parallel to the height direction of the first housing, the at least one third welding portion is arranged closer to an outer edge of the first housing than the second welding portion, and the at least one third welding portion is arranged on an outer periphery of the second welding portion.

18. The pump device according to claim 17, wherein the second housing further comprises a step portion, a side surface of the step portion is farther away from a central axis of the pump device than an outer side surface of the first groove, the side surface of the step portion is connected to an upper end surface of the second housing and a bottom surface of the step portion, the bottom surface of the step portion is connected to the outer side surface of the first groove and the side surface of the step portion, and the at least one third welding portion is closer to the central axis of the pump device than the side surface of the step portion along a radial direction of the pump device; the at least one third welding portion is in contact with the bottom surface of the step portion, and the second welding portion is in contact with the separating member; and a connection between the at least one third welding portion and the second welding portion is located on one side of the side surface of the step portion.

19. The pump device according to claim 16, wherein the pump device further comprises a first sealing ring, the second housing has an accommodating groove, the first sealing ring is located in the accommodating groove, a lower end of the first sealing ring is in contact with a corresponding bottom surface of the accommodating groove, an upper end of the first sealing ring is in contact with the separating member, the first sealing ring is closer to a central axis of the pump device than a welding position between the separating member and the second housing along a radial direction of the pump device, the separating member exerts a positive pressure on the first sealing ring to deform the first sealing ring, so that a connection between the separating member and the second housing is sealed.

20. The pump device according to claim 16, wherein the separating member further comprises a first portion and a second portion, the first portion is connected to the second portion and the cylinder portion, the second portion is connected to the first portion and the first flange portion, the second portion is vertical; the pump device further comprises a second sealing ring, the second sealing ring is sleeved on an outer circumferential side wall of the second portion, a lower end of the second sealing ring abuts against the first flange portion, an upper end of the second sealing ring abuts against the first housing, and the first housing exerts a positive pressure on the second sealing ring to deform the second sealing ring, so that a connection between the separating member and the first housing is sealed.

* * * * *